(12) United States Patent
Miller (10) Patent No.: US 7,397,400 B2
(45) Date of Patent: Jul. 8, 2008

(54) VARIABLE LENGTH DATA ENCAPSULATION AND ENCODING

(75) Inventor: Mark J. Miller, San Diego, CA (US)

(73) Assignee: ViaSat, Inc., Carlsbad, CA (US)

( * ) Notice: Subject to any disclaimer, the term of this patent is extended or adjusted under 35 U.S.C. 154(b) by 185 days.

(21) Appl. No.: 11/292,693

(22) Filed: Dec. 2, 2005

(65) Prior Publication Data

US 2007/0126612 A1    Jun. 7, 2007

(51) Int. Cl.
*H03M 7/40*    (2006.01)
(52) U.S. Cl. ..................... 341/67; 348/390.1
(58) Field of Classification Search ............ 341/67, 341/65, 51, 50; 348/390.1
See application file for complete search history.

(56) References Cited

U.S. PATENT DOCUMENTS

| | | | | |
|---|---|---|---|---|
| 5,216,503 A | * | 6/1993 | Paik et al. | 348/390.1 |
| 5,844,628 A | * | 12/1998 | Hamano et al. | 348/616 |
| 6,557,030 B1 | * | 4/2003 | Hoang | 709/217 |
| 6,594,793 B1 | * | 7/2003 | Guey | 714/776 |
| 7,215,259 B2 | * | 5/2007 | Kerber et al. | 341/51 |

* cited by examiner

*Primary Examiner*—Jean Bruner Jeanglaude
*Assistant Examiner*—Joseph Lauture
(74) *Attorney, Agent, or Firm*—Townsend and Townsend and Crew (57) ABSTRACT

Systems, apparatus, and methods of encoding variable length data for efficient transport over a wireless channel. A wireless terminal can determine a frame size to encode, and can encode and transmit the frame data as one or more encoded blocks selected from a family of block sizes. Each block size can correspond to a particular encoder rate. The frame is parsed into a number of segments having a block size selected from the family of block sizes. The block sizes are selected to maximize the spectral efficiency of the frame. Each segment is then encoded with an encoder corresponding to the block size and having a coding rate that is configured to provide a substantially equal energy per symbol for all of the blocks. The encoded blocks are then aggregated and the smallest block zero padded. The aggregate of encoded blocks can be transported in one or more bursts.

38 Claims, 9 Drawing Sheets

VARIABLE LENGTH DATA ENCAPSULATION AND ENCODING

BACKGROUND OF THE DISCLOSURE

The disclosure relates to the field of electronic communications. More particularly, the disclosure relates to encoding of variable sized data frames in an electronic communication system.

Time Division Multiple Access (TDMA) or Multi-Frequency TDMA (MF-TDMA) are commonly used techniques to support multiple access in mesh networks and in the inbound traffic for Hub spoke networks. The transmission of continuously variable size data frames, such as Internet Protocol (IP) datagrams, over a TDMA network requires the packaging of the data into messages, herein described as MAC (Medium Access Control) messages or MAC frames, each suitable for transmission within a single RF burst. The MAC message in this case may comprise a number of IP datagrams, a single IP datagram, a fraction of an IP datagram, and/or control messages. RF bursts in a wireless data transmission each consist of a number of slots, and the slot size may be chosen as small as one data symbol in length. A practical wireless data transmission may thus have a large number of possible burst lengths (measured in slots) depending on the nature of the network traffic.

Historically, the RF burst has been created by encapsulating the data (placing it into a lower level networking layer and adding headers, etc. as needed) into fixed size containers, commonly called 'cells'. When the size of the datagram is larger than the size of the cell, the datagram must be fragmented into smaller pieces, each of which will fit into one cell. Additional overhead must be added to enable the correct reassembly of the MAC message from the cells. This is how one aspect of Digital Video Broadcasting-Return Channel via Satellite (DVB-RCS, ETSI Standard EN 301 790) works, with a fundamental cell size of 48 bytes (53 Byte ATM cell with 48 bytes of usable payload). An adaptation layer (AAL-5) is used to allow datagram re-assembly. The same concept could be employed with a different cell size, however optimal selection of the cell size is not obvious.

Small cell sizes are efficient for the transport of small messages but produce a lot of overhead for the transport of large messages. A large cell size provides for the efficient transport of large messages, however are very inefficient for the transport of messages which are much smaller than the cell size since the remainder of the cell must be padded with zeros (alternatively referred to as zero filling).

A similar problem is exists with selection of the Forward Error Correction (FEC) encoding used on the physical layer. In particular, the selection of the FEC block size is a critical parameter. Information theory predicts that the reliable transport of long block size codes can be performed at a lower Eb/No than short block size codes. For example, the Random Coding Bound (RCB) establishes that an IP datagram of length 1500 bytes can be transmitted at a rate of 1 bit per symbol, with a block error rate of 1E-4, using an Eb/No of 0.25 dB. But a minimum sized IPV4 frame of 40 bytes (assuming TCP/IP) needs an Eb/No of 1.35 dB to transmit at the same rate with the same reliability (BLER=1E-4). The difference is 1.1 dB. Practical FEC codes generally deviate from the RCB much more so at short block sizes than large block sizes, so this difference becomes even larger with practical coding systems. Furthermore, many systems frequently need to transmit very small sized MAC management messages, for things such as bandwidth request, ranging, and other management information. It is common for such messages to be smaller than the minimum sized IP frame. The minimization of transmit power requirements argues for the selection of a large FEC block size. However, small IP datagrams and Media Access Control (MAC) messages will be transmitted very inefficiently due to the required zero padding to fill the code block. Smaller FEC code block selection reduces the inefficiency problem but now requires more transmit Effective Isotropic Radiated Power (EIRP).

A brute force approach to provide the most efficient use of the communication channel capacity is to simply encapsulate each MAC message into a burst that contains exactly one encoded block of data that perfectly matches its input code size to the MAC message and its output code size to the minimum slot length burst. This technique has the severe disadvantage of requiring a different encoder/decoder pair for each required length of RF burst, as measured in slots. As well, some method must be employed by both transmitter and receiver in order to coordinate the appropriate decoder to match the selected encoder.

BRIEF SUMMARY OF THE DISCLOSURE

A family of block encoders is defined where each encoder uses a different input block size and code rate. The code rate of each encoder in the family is defined such that the required Es/No, for a link quality requirement such as Block Error Rate≦threshold, of the code is approximately the same for all encoders in the family. Thus, the encoder with the largest input block size will generally have the highest code rate and the encoder with the smallest input block size will generally have the lowest code rate.

A MAC frame, of arbitrary size, is encoded using one or more encoders selected from the family of encoders. The data from the MAC frame is first parsed into sub blocks where the number of bits in each sub block is identical to a block size associated with one of the encoders in the family. A small number of zero's may need to be added to the MAC frame to force the number of bits in last sub block to be equal to the number of bits in the last encoder block. Each sub block is then encoded with the associated encoder and the encoder bits from all encoders are aggregated into a single stream and transmitted on a single RF burst using a fixed, constant symbol rate over the duration of the RF burst.

Since the encoder family is defined with essential identical Es/No requirements for the desired link quality, the reliability of the data in each code block will be essentially identical. The composite code rate for the encoded MAC frame depends on the number of information bits in the MAC frame. For large MAC frames, which generally encompasses most of the traffic, the composite code rate is very close to that of the maximum code rate used in the encoder family.

A disclosed embodiment allows the transmitter to communicate the coding plan to the receiver without explicit messages. In the embodiment, the transmitter first determines the minimum number of slots necessary to transmit a given MAC message. Then, the transmitter determines the maximum number of data bits that could be transmitted in that number of slots. The transmitter pads the message out to that number of bits before encoding. The receiver then uniquely finds the number of data bits by performing the same determination.

Matching the code block size to the MAC message size can help to solve the encapsulation efficiency problem and also substantially eliminate the need to fragment IP datagrams for encapsulation in smaller, fixed size cells. However, merely encapsulating IP datagrams in variable block sizes still requires that small IP datagrams be transmitted at a larger EIRP than larger IP datagrams. The bottom line is that the terminal EIRP capability should be selected based upon the smallest size IP datagram or MAC message. In addition, the need to have a large number of different Forward Error Correction (FEC) code block sizes is unattractive.

This disclosure presents a variable size encapsulation approach that obtains both good encapsulation efficiency and allows the Es/No performance based upon a large FEC code block size (~10,000) bits to be obtained for all sizes of IP datagrams and MAC messages. The approach uses a small number of FEC code block sizes and a finely variable rate FEC code.

The disclosure details systems, apparatus, and methods of encapsulating and encoding variable length data for efficient transport over a wireless channel. A wireless terminal can determine a message size, and can encapsulate, encode and transmit the data as one or more encoded blocks selected from a family of block sizes. Each block size can correspond to a particular encoder rate. The frame size is parsed into a number of segments having a block size selected from the family of block sizes. The block sizes are selected to maximize the size of each segment used. Each segment is then encoded with an encoder corresponding to the block size and having a coding rate that is configured to provide a substantially equal energy per symbol for all of the blocks. The encoded blocks are then aggregated and the smallest block zero padded. The aggregate of encoded blocks can then be transported in a single burst using a constant symbol rate.

The disclosure includes a method of encapsulating and encoding variable length data, including determining a length of a data message, parsing the data frame into a plurality of blocks, each block having a size selected from a plurality of predetermined block sizes, encoding each of the blocks with an encoder associated with the block size to generate an encoded block, and aggregating the encoded blocks to generate an encoded message of variable length.

The disclosure also includes a method of encoding variable length data, including receiving a data message of K-bits, determining a minimum number of slots for encoding K-bits, padding the K-bits with a zero pad having a number of bits sufficient to increase a frame length to a maximum number of bits that can be encoded in the minimum number of slots, and encoding the data frame having the zero pad with a plurality of encoders, each of the plurality of encoders encoding a portion of the data frame having the zero pad to generate a variable length encoded frame.

The disclosure also includes an apparatus for encoding a variable data length message, including a parser configured to receive the variable data length frame and generate a plurality of code blocks, wherein each of the plurality of code blocks has a distinct length, and a variable length encoder coupled to the parser and configured to encode the plurality of code blocks using a plurality of encoders to generate a plurality of encoded blocks, the variable length encoder aggregating the plurality of encoded blocks.

The disclosure also includes an apparatus for decoding an encoded variable data length message, including a parser configured to receive the encoded variable length frame and parse the encoded variable length frame to a plurality of code blocks of distinct length, and a variable length decoder coupled to the parser and configured to decode each of the plurality of code blocks using a decoder associated with a code block length.

Various features and advantages of the present disclosure can be more fully appreciated with reference to the detailed description and accompanying drawings that follow.

BRIEF DESCRIPTION OF THE DRAWINGS

The features, objects, and advantages of embodiments of the disclosure will become more apparent from the detailed description set forth below when taken in conjunction with the drawings, in which like elements bear like reference numerals.

DETAILED DESCRIPTION OF THE DISCLOSURE

A predetermined number of code block sizes can be defined. The sizes of the code blocks can be defined to be, for example, a minimum block size scaled by a power of two. Thus, a block size can be defined to be twice as large as the next smaller block size and half the size of the next larger block size. Each block size can correspond to an encoder having a coding rate that is determined based in part on the block size.

A block of data, such as an IP datagram, of arbitrary size can be encapsulated by aggregating a number of predetermined block sizes, with each block encoded with the corresponding encoder. The aggregate block can then be transmitted in a single burst, which may be an RF burst in a wireless system.

Where the input block sizes are defined to be equal to a minimum input block size scaled by a power of two, the block sizes and encoders used to generate the aggregate FEC codeword can be determined by dividing the size of the data to be encoded by the minimum block size. The result can be rounded up to the nearest integer and stored as a binary number. The bits of the binary number can represent the predetermined block sizes and encoders used in the aggregate FEC encoded block.

The individual FEC code blocks can be encoded in a predetermined order. For example, the largest blocks can be encoded first followed by smaller blocks. The final block can be zero filled if the amount of data does not exactly coincide with the input block size.

Consider a packet system where the packet sizes at the MAC layer, alternatively referred to as the MAC frames, are expected to lie between $K_{min}$ and $K_{max}$ bits. A family of FEC code block sizes $K_i = K_{min} \cdot 2^i$ can be defined, where the minimum value of i is 1 and the maximum value of i is such that the resulting maximum code block size is $\leq K_{max}$ and $> K_{max}/2$. The MAC frame can be encapsulated in an aggregated series of FEC code blocks, selected from the family of block sizes. The series of FEC code blocks can be transmitted in one RF burst using the same symbol rate throughout the burst. For a given MAC frame of length K bits, the objective is to select block sizes such that the total number of bits in all blocks, $K_{total}$, is greater than or equal to K. The number of excess bits, $K_{total}-K$ can thus be minimized, and the largest size code blocks can be used whenever possible.

Completely encapsulating the K bits ensures that the MAC frame can be completely transmitted within the RF burst. Minimizing the number of excess bits minimizes the amount of zero padding, resulting in more efficient transmission of the MAC frame. Favoring the use of big code block sizes whenever possible allows the use of higher FEC code rates.

The variable length encoder can be implemented using a relatively minor number of steps. First, the encoder can determine the total number of minimum size code blocks (M) needed to encapsulate the MAC frame by finding the smallest integer that is greater than or equal to the size of the frame (K) divided by the size of the minimum size code block ($K_{min}$):

$$M = \left\lceil \frac{K}{K_{min}} \right\rceil$$

Since the size of the member of the family of code block sizes is related by a factor of two, the binary representation of M indicates which code blocks sizes to use. For example, if K=12,500 bits, and $K_{min}$=512 bits, then M=25 (11001) which is encapsulated using 1 block of size 8192 bits, one block of size 4096 bits, and one block of size 512 bits for a total of 12,800 bits. The required padding is 300 bits, which represents 2.3% of the MAC frame size. In general, the amount of padding is guaranteed to be less than $K_{min}$. If this binary number has more digits than the number of encoders, then the largest encoder can be used multiple times as indicated by the high order bits of M. As detailed later, implementations are not limited to code blocks that differ in length by powers of two, however, and a generic technique is disclosed.

As discussed previously in this disclosure, the smaller block sizes generally require a higher Es/No to achieve the same error rate as larger block sizes. This variation in Es/No is typically undesirable, since smaller block sizes generally need to have the same reliability as larger block sizes. The error rate of smaller block sizes can be compensated by using a lower code rate for smaller block sizes than for bigger block sizes.

The code rates $r_k$ to be used with the various block sizes can be predetermined and selected such that the required Es/No for all code rates is equal to or less than a predetermined code rate, $r_{max}$, for the maximum block size, $K_{max}$. The code rate for the various block sizes should be varied to equalize Es/No requirements rather than Eb/No requirements, because the FEC block are transmitted at the same symbol rate and not at the same bit rate. Since Es/No=$\gamma$·Eb/No, where $\gamma$ is the number of information bits per symbol, the reduction of the code rate reduces the required Es/No because both $\gamma$ and Eb/No are reduced. As a result of the two reduction mechanisms, it doesn't take very much code rate reduction to equalize the Es/No requirements.

For example, consider the design of an encapsulation approach to efficiently deliver MAC frames ranging in size from 35 bytes to 1528 bytes. The family of FEC code blocks can be defined to consist of six different block sizes: 280, 560, 1120, 2240, 4480, and 8960 bits.

A frame can be transmitted using QPSK, r=¾ for the largest block size. Using a Turbo code, an Eb/No requirement of about 2.7 dB corresponds to an Es/No requirement of 4.5 dB. The Eb/No penalty when using shorter block sizes having the same code rate can be estimated using the Random Coding Bound (RCB). The estimated reduced code rate that yields the same Es/No requirement of 4.5 dB can also be derived from the RCB. The results are shown in the following table. The second column represents the Eb/No penalty that would be incurred if the rate was not reduced, while the third column represents the rate reduction necessary to match the Es/No. As can be seen, the required code rate reduction is small.

TABLE 1

Code Rate Reduction Required to Support Smaller Block Sizes.

| FEC Block Size | Eb/No Penalty | Reduced Code Rate |
|---|---|---|
| 8960 | None | 0.75 |
| 4480 | 0.13 dB | 0.74 |
| 2240 | 0.28 dB | 0.72 |
| 1120 | 0.50 dB | 0.70 |
| 560 | 0.79 dB | 0.67 |
| 280 | 1.19 dB | 0.63 |

The average code rate used for the transport of an MAC frame can be determined as a linear combination of the code rates used for each of the code blocks in the frame. This approach to encapsulation offers the use of the highest possible average code rate for every MAC frame size.

For IP systems, the described variable length encoder embodiment results in larger sized IP datagrams using a higher code rate than smaller sized IP datagrams. Since most of the IP traffic is carried in the largest sized IP datagrams, the effective code rate averaged over the entire distribution of IP datagram sizes turns out to be very close to the code rate that is used for the largest code block size. This is not the case with current encapsulation schemes, such as DVB-RCS and the current DOCSIS over satellite approach.

Figure 1:
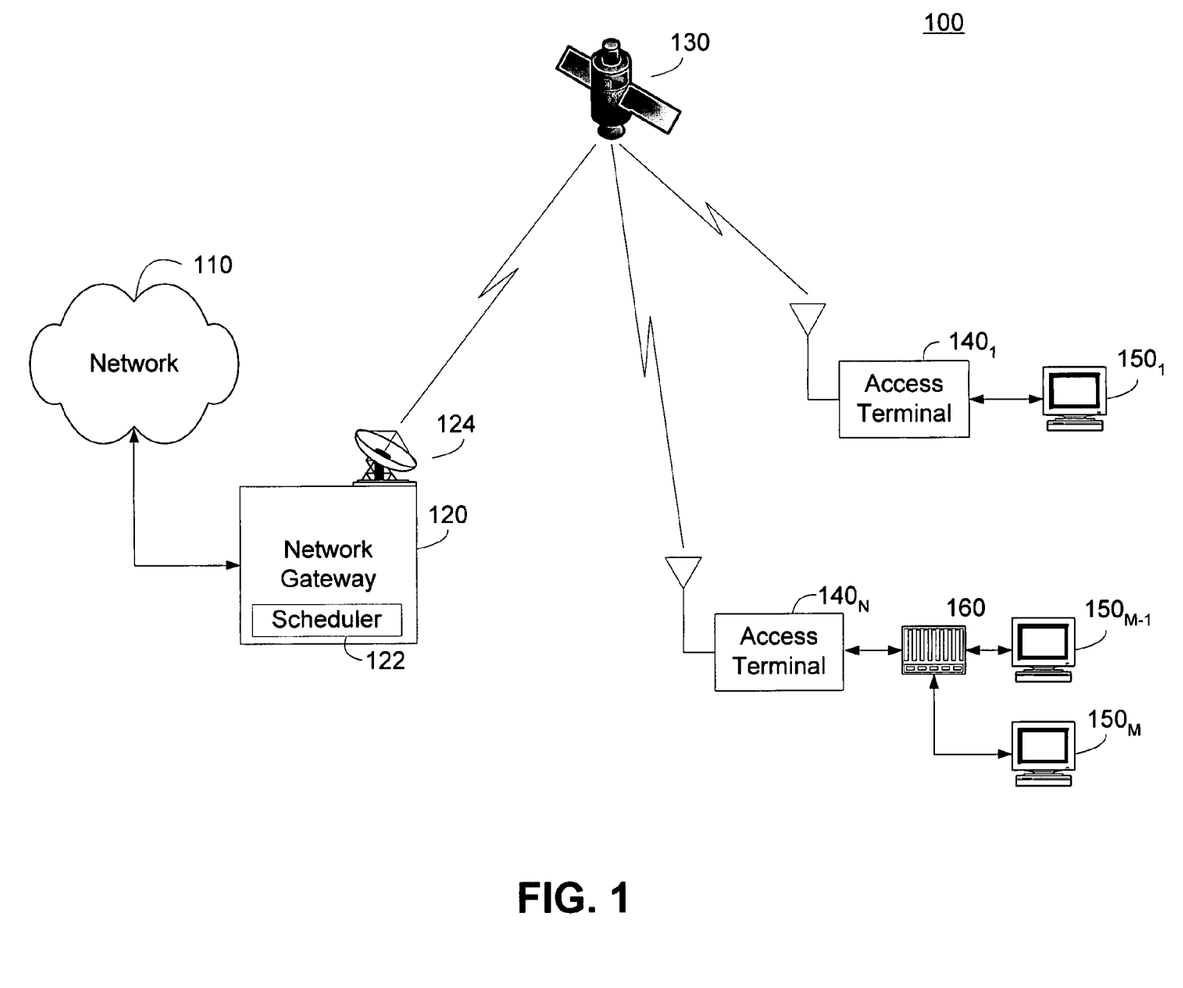
FIG. 1 is a functional block diagram of an exemplary wireless communication system implementing variable data length encoding.

FIG. 1 is a functional block diagram of an exemplary wireless communication system 100 implementing variable length encoding. The wireless communication system 100 includes a network 110 interfaced with a network gateway 120 that is configured to communicate with one or more user terminals $150_1$-$150_M$ via a satellite 130 and affiliated access terminals $140_1$-$140_N$. Although the wireless communication system 100 is illustrated as a satellite 130 based communication system, it should be noted that the variable length encoding systems, apparatus, and methods described herein are not limited to use in satellite 130 based systems.

The network 110 can be any type of network and can include, for example, a Local Area Network (LAN), a Wide Area Network (WAN), or some combination of LAN and WAN. An example of a network 110 includes the Internet.

The network gateway 120 can provide the interface between the network 110 and the satellite 130. The network gateway 120 can be configured to receive data and information directed to one or more user terminals $150_1$-$150_M$ and can format the data and information for delivery to the respective destination device via the satellite 130 and affiliated access terminals $140_1$-$140_N$. Similarly, the network gateway 120 can be configured to receive signals from the satellite 130 directed to a destination in the network 110 and can format the received signals for transmission along the network 110.

A device (not shown) connected to the network 110 can communicate with one or more user terminals $150_1$-$150_M$ through the network gateway 120. Data and information, for example IP datagrams, can be sent from a device in the network 110 to the network gateway 120. The network gateway 120 can format the MAC frame in accordance with a physical layer definition for transmission to the satellite 130. The network gateway 120 can use an antenna 124 to transmit the signal to the satellite 130.

The satellite 130 can be configured to process the signals received from the network gateway 120 and forward the MAC frame to one or more user terminals $150_1$-$150_M$. In one embodiment, the satellite 130 can be configured as a "bent pipe," where the satellite may frequency convert the signals it receives before transmitting it to its destination, but otherwise perform no processing on the contents of the signals. Alternatively, the communication system can include multiple satellites or processing "smart" satellites, instead of, or in addition to, "bent pipe" satellites, as well as other configurations.

The signals from the satellite 130 can be received by one or more access terminals $140_1$-$140_N$. Each of the access terminals $140_1$-$140_N$ can be coupled to one or more of the user terminals $150_1$-$150_M$. For example, a first access terminal $140_1$ can be coupled to a single terminal $150_1$, while an Nth access terminal $140_N$ can be coupled to a hub or router 160 that is coupled to multiple user terminals $150_{M-1}$-$150_M$.

A terminal, for example $150_1$, can transmit data and information to a network 110 destination via the wireless link. The terminal $150_1$ can be configured to transmit frames of variable length. The processing and format of the variable length frames will be explained in more detail with respect to other figures. The terminal $150_1$ can communicate a variable length frame to an associated access terminal $140_1$ for transmission to the network 110.

The access terminal $140_1$ can determine a length of the frame and from the length of the frame determine a length of a corresponding RF burst, which contains the encoded frame formatted with necessary burst overhead information. The access terminal $140_1$ can request from a scheduler 122 at the network gateway 120 a channel access assignment having a capacity sufficient to transmit the RF burst frame. The access assignment will be assumed in the exemplary discussion to be a time slot assignment, but in general the assignment can be any combination of time, bandwidth, spreading code(s), etc.

The access terminal $140_1$ can receive the assignment from the scheduler 122 via the satellite 130 and can encode and process the frame for transmission during the assigned time. The access terminal $140_1$ can transmit the encapsulated frame to the satellite 130 where it is relayed to an antenna 124 at the network gateway 120. The network gateway 120 can decode the encapsulated frame to recover the contents and can transmit the decoded frame to the network 110 where it can be routed to its desired destination.

Figure 2A:
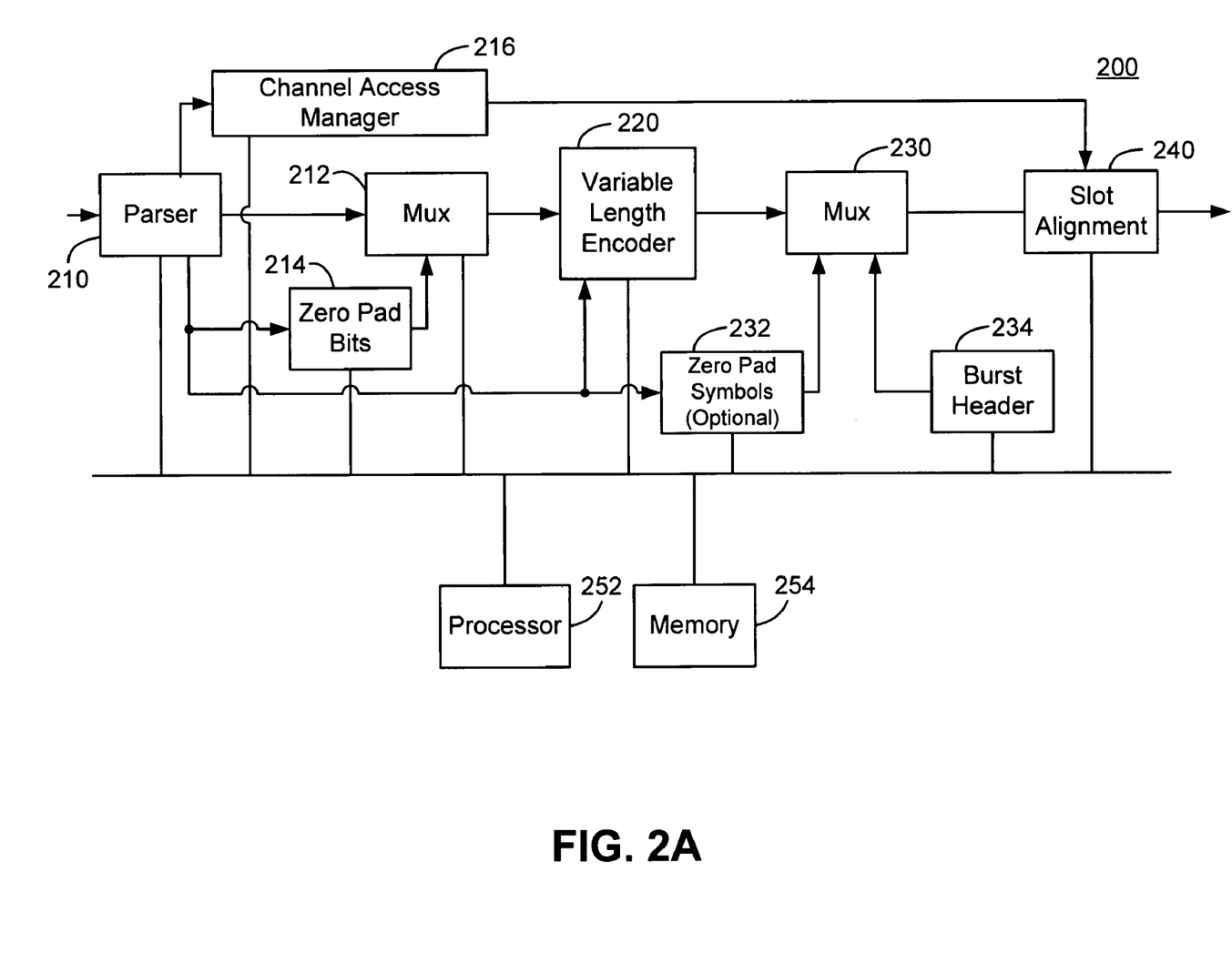
FIG. 2A is a functional block diagram of an embodiment of a variable data length transmitter.

FIG. 2A is a functional block diagram of an embodiment of a variable data length transmitter 200. The variable data length transmitter 200 can be integrated as a portion of an access terminal 140 of the wireless communication system of FIG. 1.

The variable data length transmitter 200 includes a parser 210 coupled to a channel access manager module 216, a first zero padding module 214, a second zero padding module 232, and an input multiplexor 212. The output of the input multiplexor 212 can be coupled to a variable length encoder 220. The output of the variable length encoder 220 can be coupled to an output multiplexor 230. A burst header module 234 and the second zero padding module 232 can be coupled to inputs of the output multiplexor 230. The output of the output multiplexor 230 can be coupled to a slot alignment module 240 having a control input coupled to an output of the channel access manager module 216. A processor 252 and memory 254 can be in communication with each of the modules in the variable data length transmitter 200. Some or all of the functions associated with the variable data length transmitter 200 can be performed by the processor 252 in conjunction with one or more processor usable instructions or data stored in the memory 254. In one embodiment, one or more processor usable instructions can be stored in memory 254 as software, and the software can be executed by the processor 252 to perform some or all of the functions associated with the variable data length transmitter 200. Alternate embodiments can perform some or all of these functions in a combination of fixed and/or programmable logic.

The parser 210 can be configured to receive a MAC frame from the user terminal. The MAC frame can be, for example, an IP datagram, a group of ATM cells, or a MAC management message. Alternatively, it may be some other type of packetized data. The parser 210 can be configured to determine the size of the MAC frame and, based on the size of the frame, the type of encoding and the encapsulated frame size. The parser 210 can communicate the size of the encapsulated frame to the channel access manager module 216.

The channel access manager module 216 can generate and transmit a request for a time assignment, having a duration sufficient to transmit the encapsulated frame, to a scheduler in a network gateway. Such a scheduler 122 shown in the wireless communication system of FIG. 1. The channel access manager module 216 can receive a time assignment from the scheduler in response to the request and can control the slot alignment module 240 to synchronize the encapsulated frame with the time assignment.

The parser 210 can couple the received data frame to the input multiplexor 212. The input multiplexor 212 can receive data from the parser and the first zero padding module 214. For example, where the parser 210 supplies a number of data bits that does not correspond exactly to a desired block size, the input multiplexor 212 can augment the data bits with zeros provided by the first zero padding module 214.

The output of the input multiplexor 212 is coupled to the variable length encoder 220 along with instructions relating to the format of encoding. The variable length encoder 220 can include a plurality of encoders each of which is configured to encode a particular block size at a particular coding rate. The block sizes can vary from a minimum block size, $K_{min}$, to a maximum block size, $K_{max}$. In this example, the size of each of the blocks is a power of two multiple of the minimum block size, although that is not a necessary condition for all implementations. A more detailed functional block diagram of the variable length encoder 220 is provided in FIG. 2B.

In one embodiment, the parser 210 can be configured to determine which of the encoders are to be used to encode the received frame by dividing the received frame size by the minimum block size and rounding up to the nearest integer. Representing the resultant integer as a binary number provides an indication of which of the encoders will be used to encapsulate the received frame. As in the example provided above, if the number of bits in the received frame K=12,500 bits, and $K_{min}$=512 bits, then the resultant integer M=25 (11001) which is encapsulated using 1 block of size 8192 bits, one block of size 4096 bits, and one block of size 512 bits for a total of 12,800 bits. In this case, zero pad unit 214 will append 12,800–12,500=300 bits.

Therefore, the parser 210 can provide the resultant integer, M, to the variable length encoder 220 as a control word, where each bit in the control word corresponds to an enable signal for a corresponding encoder. The variable length encoder 220 can then encode the bits using the designated encoder.

In embodiments where the size of the received frame exceeds twice the maximum block size, portions of the control word can indicate the number of passes through the maximum block encoder 226*f*. For example, in an embodiment having three different encoders, the largest block size is four times the minimum block size. If the embodiment uses a four bit control word, the two most significant bits of the four bit control word can represent the number of blocks of the maximum block size.

The variable length encoder 220 can provide the encoded blocks to an output multiplexer 230. A burst header module 234 is also coupled to an input of the output multiplexer 230. The burst header module 234 can be configured to generate the header for the encoded frame that is to be transmitted in the same burst. The header can include overhead information such as preambles or other synchronization aids.

In an embodiment of a wireless communication system, the access terminal can be assigned a time that is defined in increments of a predefined duration, which may be referred to as a slot. Because the encapsulated frame may not fit exactly into an integer number of slots, there will be some symbols in the last slot that can be zero filled. A second zero padding module 232 can be coupled to the output multiplexor 230 and can be used to append the encapsulated frame with a sufficient number of zeros to exactly fill an integer number of slots. This second zero padding module 232 output is coupled to an input of multiplexor 230. In an alternative embodiment, the additional symbols that result from the assignment of an integer number of slots need not be filled with zeros nor transmitted. This eliminates the need for the symbol zero padding module 232.

The output of the output multiplexor 230 can be coupled to a slot alignment module 240 that is configured to time align the encapsulated frame with the time assignment received by the channel access manager module 216. The time assignment module 212 can provide, for example, a synchronization signal to the slot alignment module 240 to indicate the time assignment.

Figure 2B:
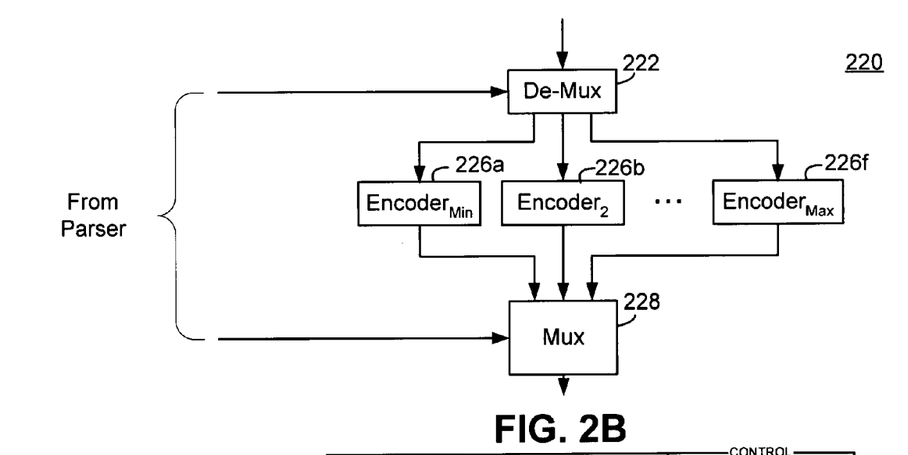
FIG. 2B is a functional block diagram of an embodiment of a variable length encoder.

FIG. 2B is a functional block diagram of an embodiment of a variable length encoder 220, such as shown in the variable length transmitter of FIG. 2A. The variable length encoder 220 can include a de-multiplexor module 222 configured to receive the data from the input multiplexor. The de-multiplexor module 222 can be coupled to each of a plurality of encoders 226*a*-226*f*, each of different code rate and block size.

The information containing the code block sizes used in the encapsulation process can be coupled from the parser to both the de-multiplexor 222 and the multiplexor 228. The allows de-multiplexor to properly route the appropriate bits in the frame to the appropriate encoders 226*a*-226*f*. Likewise, it allows the encoded output from the encoders 226*a*-226*f* to properly re-assembled together in the multiplexor 228.

The variable length encoder 220 can use various encoders 226*a*-226*f* to encode the frame. In one embodiment, the received frame can be encoded in the order of the largest to the smallest block size.

Typically, the number of bits from the received frame that are encoded by the smallest encoder does not exactly equal the encoder block size. In the embodiment shown in FIG. 2A, the first zero padding module 214 zero fills the data to ensure the data provided to the variable length encoder corresponds to the length of an encoder. In another embodiment, the first zero padding module can be omitted and the smallest encoder, for example 226*a*, will zero fill the block by appending zeros to the remaining bits from the received frame to fill the block.

The variable length encoder 220 can then concatenate each of the encoded blocks to form a single aggregate encoded frame. The outputs of the encoders 226*a*-226*f* are provided to a multiplexor 228 that can be configured to multiplex the encoded symbols generated by the active encoders into a single aggregate stream of bits.

Alternate embodiments of the variable rate encoder 220 can use a single flexible encoder that is capable of being dynamically re-configured for both block size and code rate. In such an embodiment, all the code blocks in the frame would be encoded by the single encoder, but each code block would be encoded using the block size and code rate that previously determined by the parser and provided to the variable rate encoder by the parser.

Figure 2C:
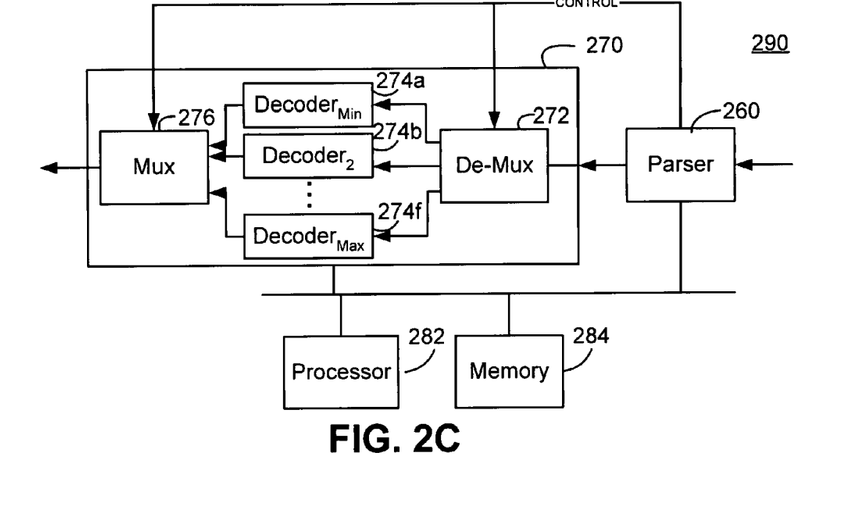
FIG. 2C is a functional block diagram of an embodiment of a decoder for a variable length encoded frame.

FIG. 2C is a functional block diagram of an embodiment of a complementary variable data length decoder 290 that can be implemented, for example, in any of the access terminals 140 or gateway 120. The variable data length receiver 290 can perform decoding of the encapsulated frame generated by the variable data length transmitter 200 of FIG. 2A.

The variable data length receiver 290 can include a parser 260 coupled to a variable length decoder 270. The parser 260 and variable length decoder 270 can also be coupled to a processor 282 and memory 284. Similar to the case with the variable data length transmitter 200 of FIG. 2A, the processor 282 and memory 284 in the variable data length receiver 290, in conjunction with one or more processor usable instructions or data stored in the memory 284, can perform some or all of the functions associated with the variable data length receiver 290. In one embodiment, one or more processor usable instructions can be stored in memory 284 as software, and the software can be executed by the processor 282 to perform some or all of the functions associated with the variable data length receiver 290.

The variable data length receiver 290 can include a parser 260 that can be configured to determine the length of the RF burst, in time slots. The parser 260 can determine the length of the RF burst, for example, based in part on the time assignment previously granted by the scheduler located in the network gateway.

The parser 260 can be configured to determine the block sizes and corresponding encoding used in the encapsulated frame based on the length of the time assignment. The parser 260 can use essentially the same algorithm used in the encoder for determining block sizes and order of encoded blocks. The parser 260 can determine encoded blocks based on an algorithm that orders the encoded blocks in a largest to smallest arrangement. For example, the parser 260 can strip the overhead information from the encapsulated frame and can compare the number of symbols with the number of symbols in a block encoded by the largest block size encoder. If the number of symbols exceeds the number of symbols in the largest block, the number of symbols in the encoded block is subtracted from the number of received symbols and the comparison repeated for the next smaller block size. The process can be repeated until the encoder block sizes for the symbols in the received frame are all identified. Note that the maximum number of bits that could be transmitted in this received burst will be decoded.

The parser 260 can be configured to parse the encapsulated frame and communicate the parsed blocks along with the information identifying the block sizes or encoders to the variable length decoder 270. The variable length decoder 270 can include a de-multiplexor module 272 coupled to an input of the variable length decoder 270. The output of the de-multiplexor module 272 can be coupled to a plurality of decoders 274a-274f that can be used to decode the received symbol blocks. The number of decoders 274a-274f can be the same as the number of encoders used in the variable data length encoder, but can be different in the situation where a single decoder is able to decode more than one code.

Each of the decoders 274a-274f can be used to decode symbols in a corresponding encoded block length. The output of the decoders 274a-274f can be coupled to an input of a multiplexer 276 that can be used to concatenate the decoded blocks. Once the various symbol blocks are decoded, the recovered blocks of bits can be concatenated to recover the original frame.

Alternate embodiments of the variable rate decoder 270 can use a single flexible decoder that is capable of being dynamically re-configured for both block size and code rate. In such an embodiment, all the code blocks in the frame would be decoded by the single decoder, but each code block would be decoded using the block size and code rate that previously determined by the parser and provided to the variable rate decoder by the parser.

The actual encoders used inside the variable length encoder 220 don't have any special requirements, but typically are block codes with the capability of adjustable code rates and block sizes. It is advantageous to have fine granularity in the code rate selection, as this allows one to more closely balance the Es/No requirements for the codes within the family. Any of the block types code commonly found in technical literature, such as, but not limited to, Reed Solomon codes, BCH codes, Golay codes and Hamming codes as well as the iteratively decoded block codes such as, but not limited to, Parallel Concatenation of Constituent Codes (PCCC), Serial Concatenation of Constituent Codes, Turbo Product Codes, and Low Density Parity Check Codes are suitable. One embodiment generates the family of codes, each of specific block size and code rate, by using a different code (different code generator matrix) for each code in the family. Another embodiment uses the well known techniques of code shortening and puncturing to allow one to generate all the codes within the family from a single systematic block code (single code generator matrix).

As an example of the later embodiment, start with a systematic block code of rate=⅘ and an input block size of K=8192. This code will take 8192 input bits and add 2048 parity bits for a total of 10240 output bits. Defined this [10240, 8192] systematic block code as the mother code. This represents the largest block size within the code family. Now a code with an input block size of K=4096 can be obtained by shortening the base code by 4096 bits. This is accomplished by using 4096 input bits and appending 4096 "0" bits. The aggregate 8192 bit block is now encoded using the mother code. After encoding, the 4096 "0" bits are removed from the systematic output of the encoder, resulting in 6144 encoded bits. The removed bits are not transmitted. This shortened code is a [6144,4096] with a rate=⅔ code. The decoder for this code inserts the 4096 deleted zeros back into the stream before decoding and then proceeds to decode using the decoder associated with the mother code. If soft decision decoding is employed, the inserted zeroes are assigned the highest possible reliability value to them.

The shortened r=⅔ code can be adjusted back up to the original rate of ⅘ by puncturing 1024 of the 6144 encoded bits. Puncturing consists of throwing away the bits on the encoder side (i.e., not transmitting them) and inserting erasures into the stream on the decoding side. When soft decision decoding is used, the inserted erasure is assigned the lowest soft decision reliability value to it. After both shortening and puncturing, then new code will be a [5120,4096] for a code rate of ⅘.

To equalize Es/No requirements it is needed to use a code rate less than ⅘ for the code with an input block size of 4096 bits. This is easily accomplished by puncturing fewer than 1024 bits. For example puncturing 1000 bits instead of 1024 results in a [5144,4096] block code which has a code rate of 0.7963. One can see the fine granularity in code rate that can be easily obtained with puncturing.

This shorting and puncturing process can be continued to generate block sizes of K=2048, 1024, and 512, each with code rate slightly less than the previous. The exact code rates are selected to balance the Es/No requirements each of the codes. This provides a family of codes which are all constructed from the a single systematic mother code.

Figure 3A:
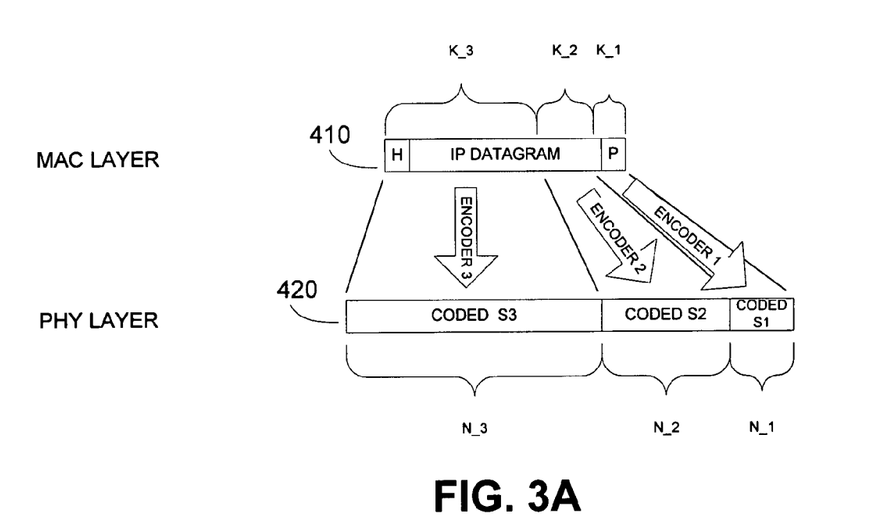
FIGS. 3A-3D are diagrams of examples of variable data length encoding.
Figure 3B:
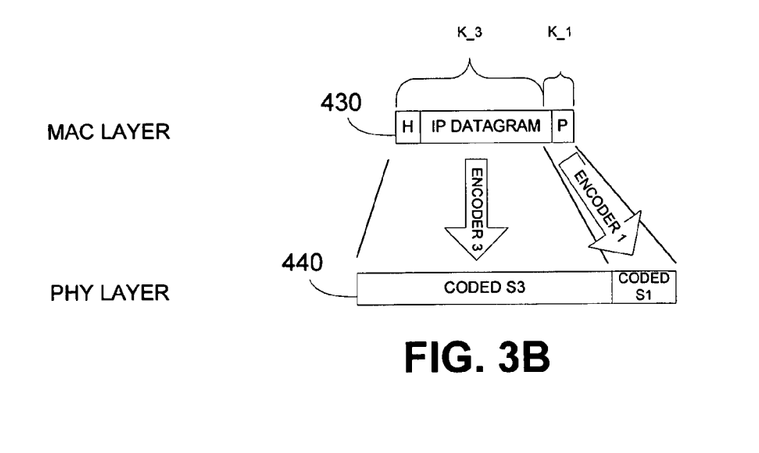

FIGS. 3A-3B are diagrams of examples of variable data length encoding in accordance with one embodiment. In the example shown in FIG. 3A, the length of the frame 410 including an MAC header (H) is greater than the sum of the length of encoders 3 and 2 (K_3+K_2) and less than the sum of the length of encoders 3, 2 and 1 (K_3+K_2+K_1). The frame 410 is padded with a zero padding portion (P) to length K_3+K_2+K_1. The frame 410 can then be parsed and encoded by the three encoders to produce segments S3, S2 and S1 of an encapsulated frame 420 of length N_3+N_2+N_1 symbols.

FIG. 3B is another example in which the length of the frame 430 including the MAC header (H) is greater than the length of encoder 3 (K_3) but less than the sum of the length of encoders 3 and 1 (K_3+K_1). The frame 430 is padded to length K_3+K_1, parsed, and encoded by the two encoders to produce segments S3 and S1 in an encapsulated frame 440 of length N_3+N_1 symbols. Note that encoder 2 is not used in this second example.

Figure 3C:
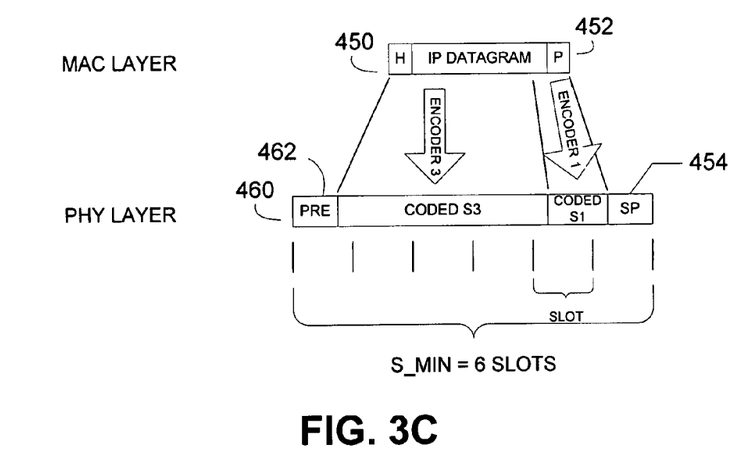

In many wireless systems, users transmit in bursts in which each increment of possible transmission time is referred to as a slot. Typically, the slot length is a fixed number of channel symbols. Transmitters will occasionally pad out the last slot of a transmission, as shown in FIG. 3C. Here, an embodiment of the variable data length encoder disclosed herein is applied in a slotted channel that also requires a burst preamble (PRE) 462. As before, the uncoded frame data 450 is padded out with a padding portion 452 to fit the appropriate encoder selection, in this case Encoder 3 and Encoder 1. The aggregate channel burst consisting of the preamble PRE 462, and encoded segments 3 and 1, now uses a fraction of a slot more than 5 channel slots. Thus, the minimum number of slots that can be used to transmit this frame, known as S_MIN, is six. Therefore, the encapsulated frame 460 having the preamble 462 can be appended with an output padding portion (SP) 454 to align the number of symbols to an integer number of slots. In an alternative embodiment, the final symbol padding (SP) is not performed and the transmitted RF burst is slightly shorter in duration than the assigned number of time slots.

Figure 3D:
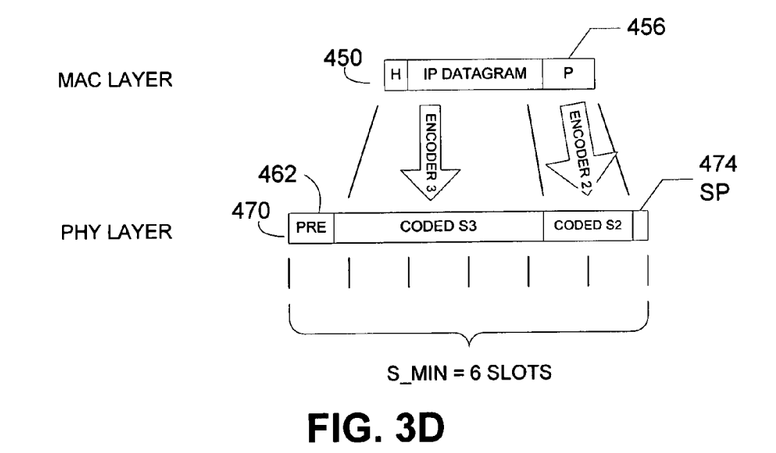

FIG. 3D demonstrates the ambiguities possible when using a variable length encoder and time slot definitions which are greater than 1 symbol in duration. Here, the same uncoded frame data 450 of FIG. 3C is padded further with an extended padding portion 456 and now encoded with Encoder 3 and Encoder 2 (Encoder 2 being larger than Encoder 1). The resulting encapsulated frame 470 for the physical layer burst, including identical preamble 462, also fits into 6 slots. However, now decreased output padding 474 is required. Thus, if a receiver knows that 6 slots are being used to transmit a burst, it may not know which scheme was employed if a predetermined algorithm is not performed at the transmitter and receiver. Note, that this ambiguity is not resolved by use of the alternative embodiment which eliminates the symbol padding on the end of the RF burst. The fundamental problem is that the receiver cannot determine which encapsulation approach (that of FIG. 3C or that of FIG. 3D) was used given only the knowledge that the RF burst is 6 times slots in duration. This problem exist with both embodiments.

Thus, for a receiver to be able to unambiguously decode the variable data length encoded data in a slotted channel, two things need to happen. The transmitter calculates precisely how much time is needed for a particular MAC frame, and the receiver and transmitter independently and uniquely determine exactly what size code blocks are in an RF burst that will be transmitted in the allocated time duration.

The first requirement can be easily met. The transmitting terminal executes a composition algorithm that determines which code block sizes will be used to encapsulate the frame. The composition algorithm was previously explained by example for the case when the block sizes are related to each other by factor of 2 and is detailed for the general case in subsequent text. Each code block size, $K_i$, has a known number of symbols, $N_i$, that are required to transmit that size code block transmit. Note that the output codeword sizes in symbols will not generally be related to each other in multiples of 2, due to varying code rates. Given the knowledge of the MAC frame size, the burst duration in symbols is easily calculated by summing up the appropriate $N_i$'s and adding to it the known physical layer overhead (preambles, guard times, etc).

The receiving terminal executes a decomposition algorithm to determine the code composition from the grant size. This is easily accomplished by first subtracting off the known physical layer overhead, in symbols, from the grant size (in symbols). Then, if the left over portion is greater than the number of symbol in the largest code block size, then this code block size will be present in the burst. If it is not present, then repeat the process with the second biggest block size. At anytime a code block is present, subtract the number of symbols in that code block from the leftover amount to get a new leftover amount. This process repeats itself all the way down to the smallest block size. The final leftover amount will be less than the smallest block size. By convention, codewords are transmitted in a burst from largest to smallest.

When the time durations are allocated with resolution of a symbol or less, the composition algorithm and decomposition algorithm will yield the same result. Thus the transmitter and receiver can also uniquely determine the code block sizes that compose the RF burst, given the burst duration.

When the time durations are allocated with resolution of more than 1 symbol, the composition algorithm and decomposition algorithm may not always yield the same result. This is because it is not known how much of the last time slot is padding (unused symbols). Different assumptions on the padding amount will result in different answers in the RF burst composition. This was depicted qualitatively in the examples of FIGS. 3C and 3D. One remedy to this is to have the transmitter run the decomposition algorithm after the reception of the grant. Since both the transmitter and receiver will run the same decomposition algorithm, they will always arrive at the same answer for the codeblock composition.

An artifact of this approach is that each transmitting terminal will need to first calculate the number of time slots required to transmit the MAC frame and then re-calculate the code block sizes in the RF burst based upon the granted number of time slots. The re-calculation is performed even if the grant size was the same as the request size. The resulting code block sizes may be different than the original number used to determine the minimum number of slots.

Figure 4:
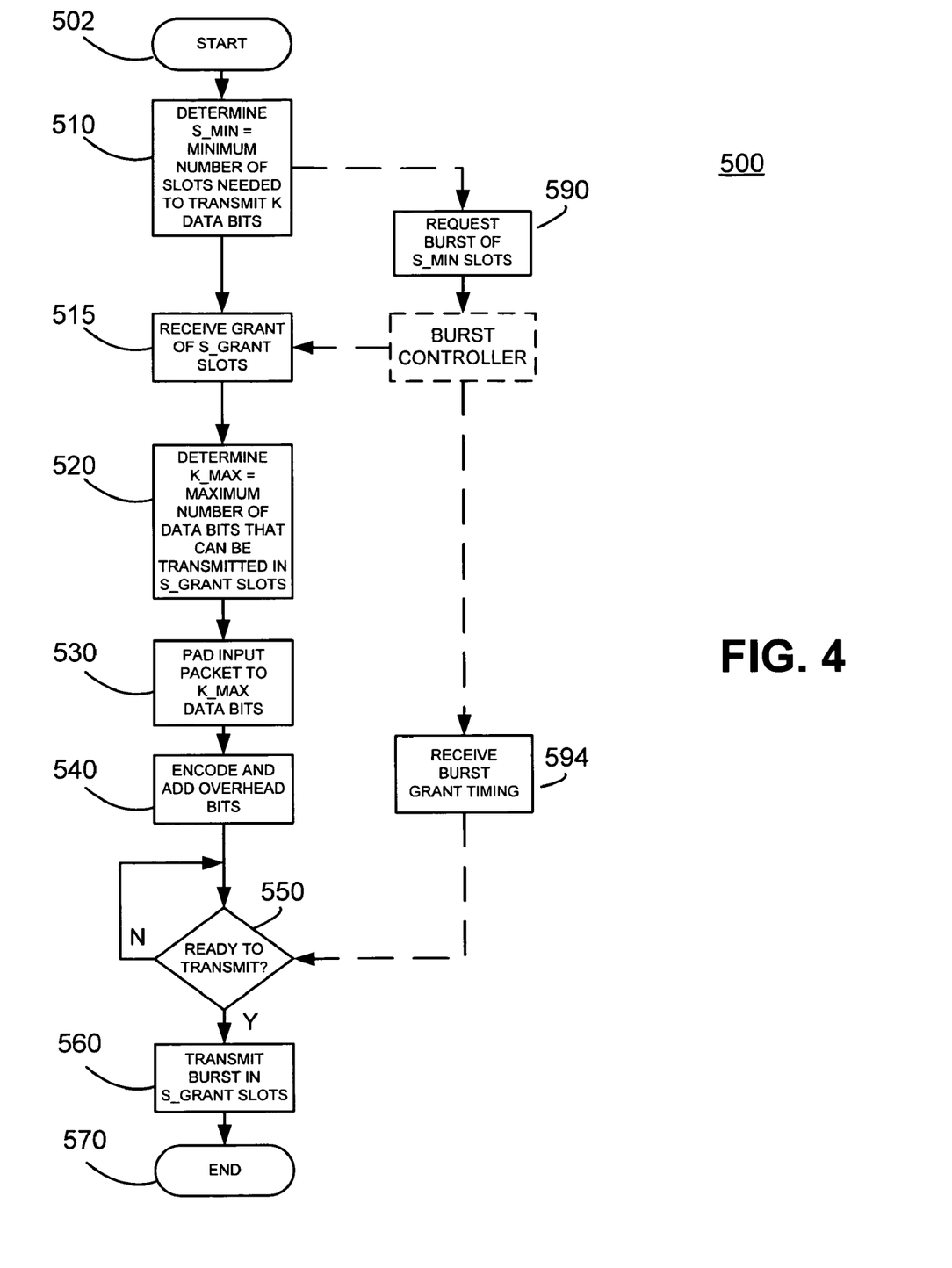
FIG. 4 is a flowchart of an embodiment of a method of variable data length encoding in a transmitter portion of an access terminal.

FIG. 4 is a flowchart of an embodiment of a method 500 of variable data length encoding in a slot based time allocation system. The method 500 can be performed, for example, by one of the embodiments of the variable data length transmitter shown in FIGS. 2A and 2B.

The transmitter starts 502 the method 500 when it receives a frame to encode and send. The transmitter proceeds to block 510 and determines the number of bits in the frame and then determines the minimum integer number of slots that are needed to transmit the frame. Block 510 is referred to as the composition algorithm. The transmitter receives an explicit or implicit grant of S_GRANT slots in block 515. For example, a grant could be implicit if the transmitter was operating in some kind of virtual circuit or other configuration where it knows a priori that certain transmission slots are available to it. Of course, an explicit grant could be made from the transmitter and granted from a central scheduler, as well.

The transmitter then proceeds to block 520 and determines the maximum number of data bits that can be transmitted in this minimum integer number of slots. Block 520 is referred to as the decomposition algorithm. The transmitter can be configured to zero pad the input frame to the maximum number of data bits that can be transmitted in the number of slots in order to eliminate any ambiguity at the receiver when determining which encoders were used to encode the data. Additionally, the transmitter may be constrained to limit the number of code blocks corresponding to each code. For example, each code block size may be limited to appearing only once in an encapsulated frame.

After determining the maximum number of data bits, the transmitter proceeds to block 530 and pads the frame to be encoded with zeros to produce a frame having a length equal to the length of the maximum number of bits that can be encoded within an encapsulated frame fitting within the integer number of slots. The transmitter proceeds to block 540 and encodes the bits and adds the overhead bits.

After encoding the bits, the transmitter proceeds to decision block 550 and waits for a time assignment in response to a burst request. Once the transmitter determines at block 510 the number of slots needed to transmit the encoded frame, the transmitter can launch an independent process that requests the number of slots from the network gateway.

The independent time request process begins when the transmitter proceeds to block 590 and requests a time burst having a duration equal to the minimum integer number of time slots. The transmitter can, for example, transmit a request to a burst controller at a network gateway. The transmitter then proceeds to block 594 to wait for and receive a burst request grant having the time assignment associated with the burst request. The transmitter indicates receipt of the grant to decision block 550 to indicate that a time assignment is received.

The transmitter proceeds from decision block 550 to block 560 where it transmits the encapsulated frame as a burst synchronized with the time assignment and having a duration equal to the minimum integer number of slots. The transmitter then proceeds to block 570 and is done.

Figure 5:
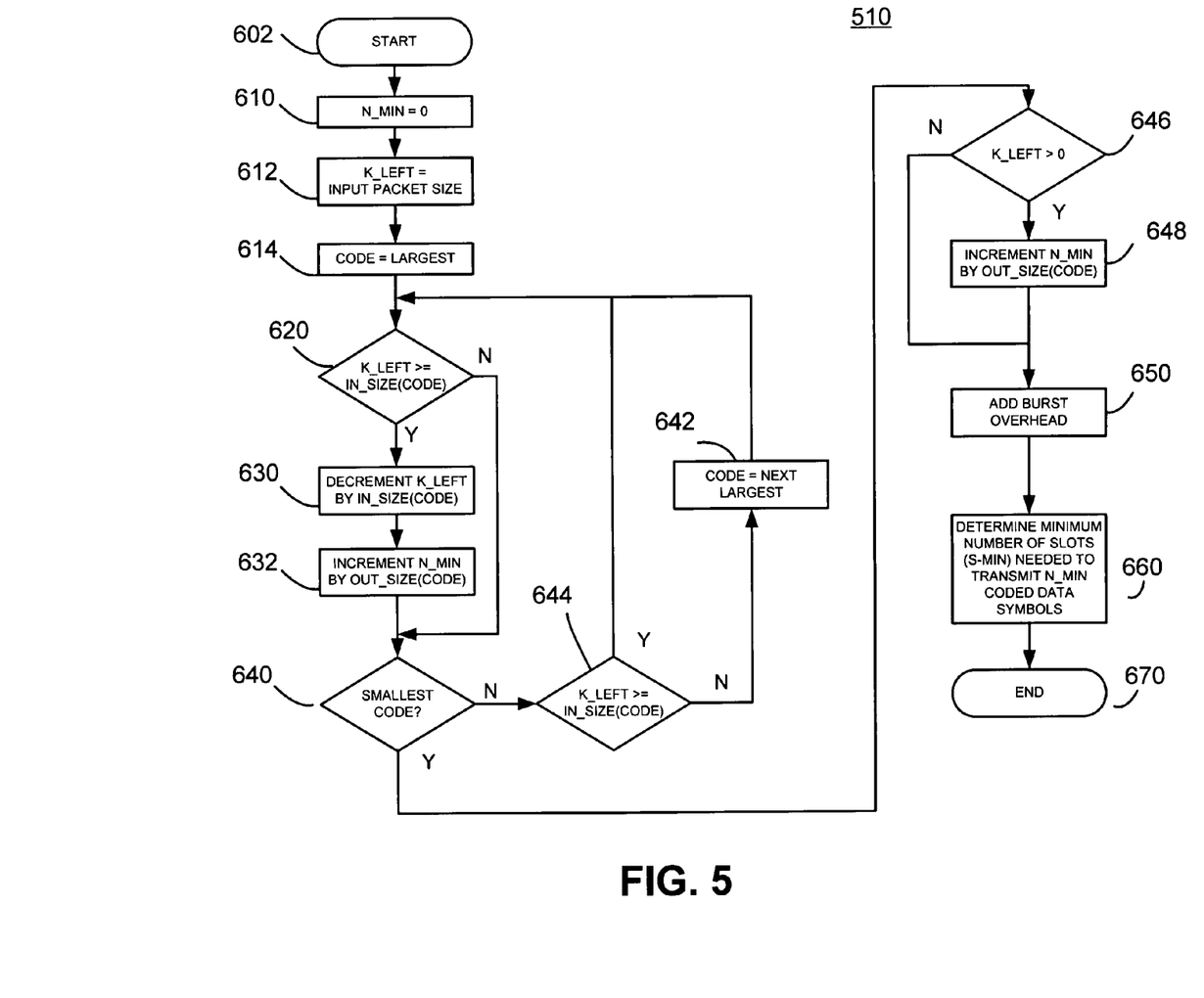
FIG. 5 is a flowchart of an embodiment of a method of determining the minimum number of slots required in a slotted time embodiment.

FIG. 5 is a flowchart of an embodiment of a method 510, the composition algorithm, of determining the minimum number of slots that can be used to transmit a predetermined number of data bits. The method 510 can be performed by a variable data length transmitter, such as the embodiments shown in FIG. 2A, and when performing the method of FIG. 4. This embodiment is a generalization of the technique provided earlier wherein the binary representation of the ratio of the size of the message to the minimum encoder size determined directly the encoders used.

The method 510 starts 602 when the transmitter receives data to be encoded. The transmitter proceeds to block 610 to initialize the counters and pointers used in the method 510. At block 610, the transmitter initializes the symbol counter by setting it to zero. The transmitter then proceeds to block 612 and initializes the frame bit counter indicating the number of bits remaining to be encoded to the number of bits in the frame. The transmitter then proceeds to block 614 and sets a pointer identifying the current encoder as the encoder corresponding to the largest code.

The transmitter then proceeds to decision block 620 and determines whether the number of bits remaining to be encoded is greater than or equal to the block size associated with the current encoder. If not, the encoder associated with that block size is not used for the data and the transmitter proceeds to decision block 640.

Returning to decision block 620, if the number of bits to be encoded is greater than or equal to the block size, the transmitter proceeds to block 630 and decrements the bits remaining, K_LEFT, by the number of input bits of the current code. The transmitter proceeds to block 632 and increments the symbol counter N_MIN by the number of symbols generated by the encoder associated with the block size.

The transmitter proceeds to decision block 640 to determine if the current code block corresponds to the smallest code size. If not, the transmitter proceeds to block 642 and sets the size of the code block to the next largest size relative the present code block size. In one embodiment, each code block size is one half the size of the immediately larger block size. Thus, the next largest code block size can be determined as one half the present code block size. After updating the code block size, the transmitter returns to decision block 620.

If, at decision block 640 the transmitter determines that the block size corresponds to the smallest block size, the transmitter proceeds to block 650 where it adds the number of burst overhead bits to the symbol counter. In one embodiment, the number of symbols allocated to the burst overhead is a constant. In another embodiment, the number of symbols used in the burst overhead is based in part on the number of symbols in the encapsulated block.

If the number of burst overhead symbols is not constant, the transmitter, at block 650, generates the overhead information and adds the number of overhead symbols to the symbol count. The transmitter proceeds to block 660 and determines the minimum number of slots required to transmit the number of symbols represented by the symbol counter.

The transmitter can, for example, divide the symbol count by the number of symbols per slot and round up to the next integer. The transmitter then proceeds to block 670 and is done.

Figure 6:
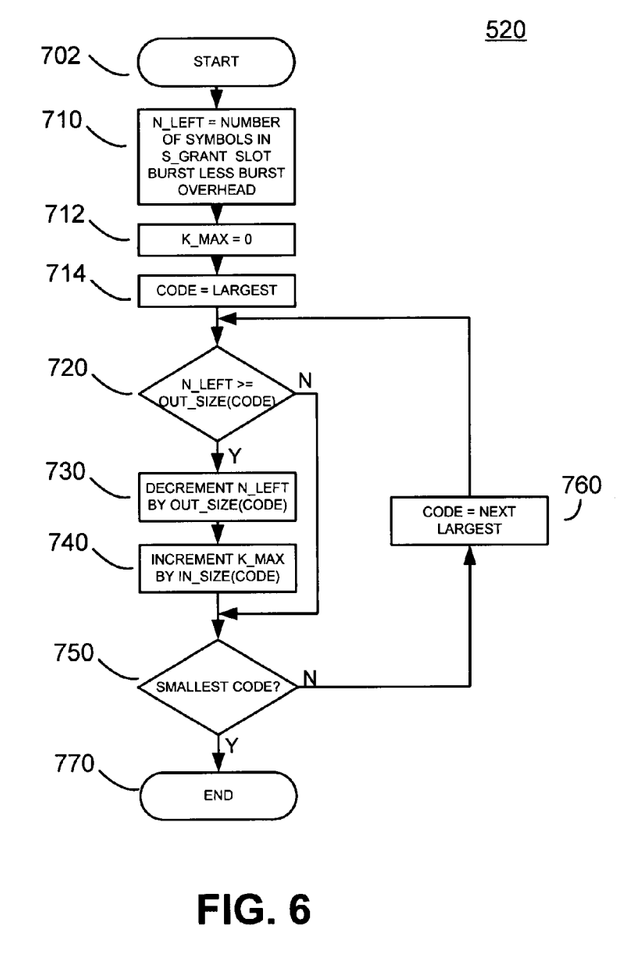
FIG. 6 is a flowchart of an embodiment of a method of determining the maximum number of data bits that can be transmitted in a given number of slots in a slotted time embodiment.

FIG. 6 is a flowchart of an embodiment of a method 520, the decomposition algorithm, of determining the maximum number of symbols that can be encapsulated in a predetermined integer number of slots. The method 520 can be performed by the variable data length transmitter of FIG. 2A during the execution of the method 500 of FIG. 4.

The method 520 starts 702 when the transmitter needs to determine the maximum number of bits that can be encoded by the transmitter in a predetermined number of slots, S_GRANT. The transmitter proceeds to block 710 and initializes the number of symbols remaining in the burst, N_LEFT, as the total number of symbols in the grant less a number of symbols allocated to burst overhead.

The transmitter proceeds to block 712 and initializes the bit counter K_MAX to zero, then proceeds to block 714 to initialize the current code pointer to the largest code. The transmitter then proceeds to decision block 720 to determine if the number of symbols remaining is greater than or equal to the number of symbols in the current code size. If it is, the present encoder can be used to encode the input frame and the process proceeds to block 730.

At block 730, the transmitter decrements the number of symbols remaining by the number of symbols in the code block. The transmitter then proceeds to block 740 and increments the bit counter K_MAX by the number of input bits required to generate the symbols. The number of input bits is related to the number of symbols by the code rate. After incrementing the bit counter by the number of input bits corresponding to the number of output symbols, the transmitter proceeds to decision block 750.

If, at decision block 720 the transmitter determines that the number of symbols left is less than the symbols for the current code size, the transmitter determines that the encoder is not used for the present frame and proceeds directly to decision block 750. At decision block 750, the transmitter determines if the code pointer is pointing at the smallest code.

If, at decision block 750, the transmitter determines that the code pointer is not pointing to the smallest code, the transmitter proceeds to block 760 where the transmitter sets the code pointer to the next smaller code. The transmitter then returns to decision block 720.

If, at decision block 750, the encoder determines that the code pointer identifies the smallest code size, there are no additional codes to verify. The transmitter proceeds to block 770 and is done.

Figure 7:
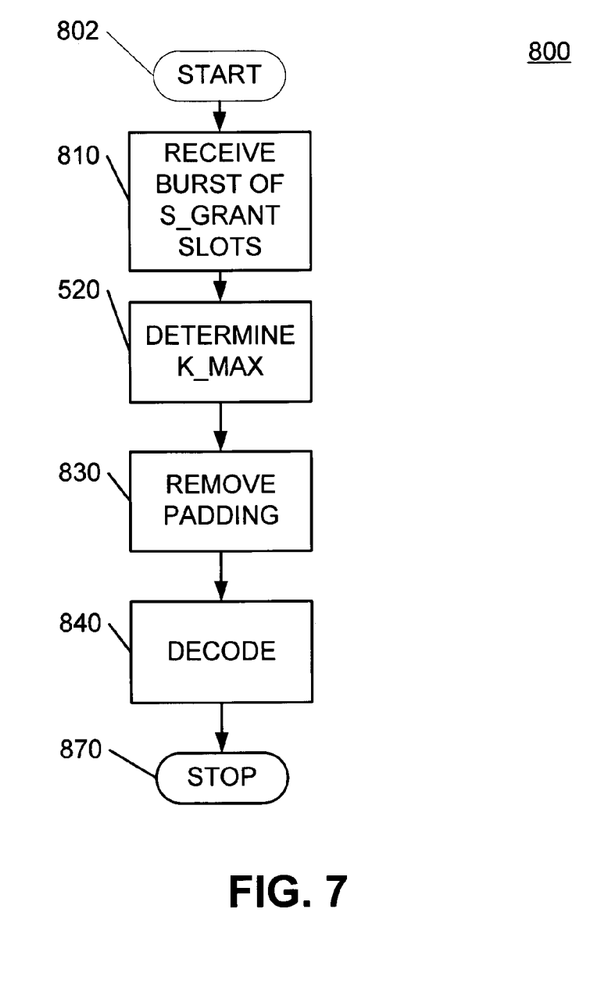
FIG. 7 is a flowchart of an embodiment of a method of variable length decoding in a receiver portion of an access terminal.

FIG. 7 is a flowchart of an embodiment of a method to decode variable length frames at the receiver portion of an access terminal 140 or gateway 120 of FIG. 1. The process starts 802 when a receive burst of length S_GRANT slots is received 810. The receiver can then use the same decomposition algorithm 520 as used by the transmitter to determine the maximum number of data bits K_MAX that could have been transmitted in the S_GRANT slots of the instant frame. In step 830, the output (final) padding is removed and then variable length frame is decoded in step 840, by the apparatus of FIG. 2C or equivalent. The decode process then terminates in step 870.

Systems, apparatus, and methods of variable data length encapsulation and encoding have been described herein. The system can receive a data message of variable length and determine the length of the message. The variable length encoder can then determine a number of sub block encoders that can be used to encode the frame. Each encoder can operate at a different code rate, or some of the encoders can operate at the same rate. The encoded portions can be aggregated or otherwise concatenated. The encoded blocks can be aggregated in a predetermined order. For example, the blocks may be ordered in decreasing size. Overhead symbols for the aggregated blocks can be determined and appended to the aggregated blocks to generate an encapsulated message. The encapsulated message can be transmitted in a single burst.

The steps of a method, process, or algorithm described in connection with the embodiments disclosed herein may be embodied directly in hardware, in a software module executed by a processor, or in a combination of the two. The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes.

The above description of the disclosed embodiments is provided to enable any person of ordinary skill in the art to make or use the disclosure. Various modifications to these embodiments will be readily apparent to those of ordinary skill in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What is claimed is:

1. A method of encoding variable length data, the method comprising:
   determining a length of a data frame;
   parsing the data frame to a plurality of blocks, including determining a largest block size having a length less than the length of the data frame, each block having a size selected from a plurality of predetermined block sizes;
   encoding each of the blocks with an encoder associated with the block size to generate an encoded block; and
   aggregating the encoded blocks to generate an encoded frame of variable length.

2. The method of claim 1, wherein determining the length of the data frame comprises determining a number of bits in the data frame.

3. The method of claim 1, wherein parsing the data frame comprises:
   determining a ratio of the length of the data frame to a minimum block size;
   determining the sizes of the blocks based on the ratio, wherein each size is an integer multiple of the minimum block size.

4. The method of claim 3, wherein the integer multiple comprises a power of two.

5. The method of claim 1, wherein each of the plurality of predetermined block sizes comprises an integer multiple of a minimum block size.

6. The method of claim 1, wherein encoding each of the blocks comprises encoding each block at a code rate that is greater than a code rate for a smaller block size.

7. The method of claim 1, wherein encoding each of the blocks comprises encoding the plurality of blocks using at least two code rates.

8. The method of claim 1, further comprising requesting a time assignment having a duration sufficient to transmit the encoded frame.

9. The method of claim 1, further comprising requesting a time assignment having a duration comprising a multiple of predetermined slot durations.

10. The method of claim 1, further comprising receiving a time assignment having a duration sufficient to transmit the encoded frame.

11. The method of claim 1, further comprising transmitting the encoded frame in a single burst.

12. The method of claim 1, further comprising:
    generating overhead data based on the encoded frame; and
    appending the overhead data to the encoded frame.

13. The method of claim 1, further comprising zero padding the data frame to increase its length to coincide with the length of the plurality of blocks.

14. The method of claim 1, further comprising zero padding the data frame to increase its length to maximize a smallest code block length within a predetermined number of time slots of fixed duration.

15. A method of encoding variable length data, the method comprising:
    receiving a data frame of K-bits;
    determining a minimum number of slots for encoding K-bits;
    padding the K-bits with a zero pad having a number of bits sufficient to increase a frame length to a maximum number of bits that can be encoded in the minimum number of slots;
    encoding the data frame having the zero pad with a plurality of encoders, each of the plurality of encoders encoding a portion of the data frame having the zero pad to generate a variable length encoded; and
    transmitting the variable length encoded frame in a burst having a duration substantially equal to a duration of the minimum number of slots.

16. The method of claim 15, wherein encoding the data frame comprises:
    parsing the data frame into at least a first code block and a second code block;
    encoding the first code block at a first code rate to generate a first encoded block;
    encoding the second code block at a second code rate to generate a second encoded block; and
    aggregating the first encoded block with the second encoded block.

17. The method of claim 16, wherein the first code rate is distinct from the second code rate.

18. The method of claim 16, wherein aggregating the first code block with the second code block comprises order in the first code block and second code block based on code block length.

19. The method of claim 15, further comprising generating overhead bits based on the variable length encoded frame.

20. An apparatus for encoding a variable data length frame, the apparatus comprising:
    a parser configured to receive the variable data length frame and generate a plurality of code blocks, wherein each of the plurality of code blocks has a distinct length;
    a variable length encoder coupled to the parser and configured to encode the plurality of code blocks using a plurality of encoders to generate a plurality of encoded blocks, the variable length encoder aggregating the plurality of encoded; and
    a slot alignment module coupled to the variable length encoder and configured to align the plurality of encoded blocks with a time assignment.

21. The apparatus of claim 20, further comprising a zero padding module coupled to the variable length encoder and configured to append the plurality of encoded blocks with a number of symbols sufficient to extend a length of the plurality of encoded blocks to an integer number of symbols in a predetermined time slot.

22. The apparatus of claim 20, wherein each of the plurality of code blocks has a length that is an integer multiple of a minimum code block size.

23. The apparatus of claim 22, wherein the integer multiple comprises a power of two.

24. The apparatus of claim 20, wherein the plurality of encoders comprises at least two distinct code rates.

25. The apparatus of claim 20, wherein each of the plurality of encoders comprises a code rate that is based on a length of an associated code block.

26. An apparatus for decoding an encoded variable data length frame, the apparatus comprising:
    a parser configured to receive the encoded variable length frame and parse the encoded variable length frame to a plurality of code blocks of distinct length; and
    a variable length decoder coupled to the parser and configured to decode each of the plurality of code blocks using a decoder associated with a code block length, wherein the parser is configured to parse the encoded variable length frame to one or more code block sizes that maximize a number of data bits contained within the encoded variable length frame.

27. The apparatus of claim 26, wherein the parser is configured to determine a number of slots corresponding to the encoded variable length frame and determine a maximum number of data bits contained within the number of slots.

28. The apparatus of claim 26, wherein the parser is configured to determine a maximum number of data bits contained within the encoded variable length frame, determine a number of symbols corresponding to the maximum number of data bits; and remove zero padding symbols from the encoded variable length frame in excess of the number of symbols.

29. The apparatus of claim 26, wherein the parser is configured to parse the symbols in the encoded variable length frame to a plurality of symbol blocks, wherein a first symbol block includes twice as many symbols as a second symbol block.

30. The apparatus of claim 26, wherein the variable length decoder comprises a plurality of decoders, each decoder configured to decode symbols encoded using a distinct encoding rate.

31. A method of decoding variable length data, the method comprising:
receiving a burst of encoded symbols;
determining a maximum number of data bits contained within the burst of encoded symbols;
determining a size of one or more blocks of encoded symbols based on the maximum number of data bits;
decoding each of the one or more blocks of encoded symbols using a decoder from a plurality of decoders corresponding to the size of each of the one or more blocks;
determining a number of symbols corresponding to the maximum number of data bits; and
removing one or more zero padding symbols from the burst of encoded symbols in excess of the number of symbols.

32. The method of claim 31, wherein receiving the burst of encoded symbols comprises receiving the burst of encoded symbols in an integer number of slots.

33. The method of claim 32, wherein determining the maximum number of data bits corresponds to determining the maximum number of data bits based on the number of slots.

34. The method of claim 31, wherein each of the decoders from the plurality of decoders is configured to decode data bits encoded according to a distinct code rate.

35. One or more storage devices configured to store one or more processor usable instructions, when executed by one or more processors, performing the method comprising:
receiving a data frame of K-bits;
determining a minimum number of slots for encoding K-bits;
padding the K-bits with a zero pad having a number of bits sufficient to increase a frame length to a maximum number of bits that can be encoded in the minimum number of slots;
encoding the data frame having the zero pad with a plurality of encoders, each of the plurality of encoders encoding a portion of the data frame having the zero pad to generate a variable length encoded frame; and
generating overhead bits based on the variable length encoded frame.

36. An apparatus for decoding an encoded variable data length frame, the apparatus comprising:
means for determining a length of a data frame;
means for parsing the data frame to a plurality of blocks, each block having a size selected from a plurality of predetermined block sizes;
means for encoding each of the blocks with an encoder having a coding rate based in part on the block size to generate an encoded block; and
means for aggregating the encoded blocks to generate an encoded frame of variable length; and
means for zero padding the data frame to increase its length to maximize a smallest code block length within a predetermined number of time slots of fixed duration.

37. The apparatus of claim 36, wherein each of the plurality of predetermined block sizes comprises an integer multiple of a minimum block size.

38. The apparatus of claim 36, further comprising means for zero padding the data frame to increase its length to maximize a smallest code block length within a predetermined number of time slots of fixed duration.

* * * * *